(12) United States Patent
Garza

(10) Patent No.: US 10,786,787 B2
(45) Date of Patent: Sep. 29, 2020

(54) METHODS OF FLUORINATING FILTERS USED IN THE MANUFACTURE OF A SEMICONDUCTOR DEVICE

(71) Applicant: Samsung Electronics Co., Ltd., Suwon-si, Gyeonggi-do (KR)

(72) Inventor: César M. Garza, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 191 days.

(21) Appl. No.: 15/853,910

(22) Filed: Dec. 25, 2017

(65) Prior Publication Data

US 2019/0105613 A1 Apr. 11, 2019

Related U.S. Application Data

(60) Provisional application No. 62/570,078, filed on Oct. 9, 2017.

(51) Int. Cl.

| B01D 71/36 | (2006.01) |
|---|---|
| B01D 65/00 | (2006.01) |
| B01D 67/00 | (2006.01) |
| B01D 71/26 | (2006.01) |

(52) U.S. Cl.
CPC ......... *B01D 71/36* (2013.01); *B01D 65/006* (2013.01); *B01D 67/0088* (2013.01); *B01D 67/0093* (2013.01); *B01D 71/26* (2013.01)

(58) Field of Classification Search
CPC ........ B01D 71/30; B01D 71/32; B01D 71/34; B01D 71/36; B01D 67/0093; B01D 71/26; B01D 65/006; B01D 67/0088
See application file for complete search history.

(56) References Cited

U.S. PATENT DOCUMENTS

| 4,142,032 A * | 2/1979 | D'Angelo ................ C08F 8/20 525/333.4 |
|---|---|---|
| 4,657,564 A * | 4/1987 | Langsam ........... B01D 67/0093 95/51 |
| 5,112,941 A * | 5/1992 | Kasai ................ B01D 67/0093 528/128 |
| 8,828,619 B2 | 9/2014 | Lee et al. |
| 2007/0269601 A1 | 11/2007 | Taege et al. |
| 2010/0221495 A1* | 9/2010 | Ohmi ..................... C08J 7/126 428/172 |
| 2010/0233363 A1 | 9/2010 | Uchiyama |
| 2017/0137589 A1* | 5/2017 | Garza ............... B01D 67/0093 |

* cited by examiner

*Primary Examiner* — David C Mellon
(74) *Attorney, Agent, or Firm* — Renaissance IP Law Group LLP

(57) ABSTRACT

A semiconductor filter may be treated by fluorinating the surface of the filter. The filter has a polymer membrane held by a support structure within the filter's housing. The housing has an inlet and outlet for fluids being filtered, with the membrane held between the inlet and outlet. The support structure holds the membrane such that fluids flowing through the filter pass through the membrane. The treatment purges air from the filter before flowing a gas mixture including a fluorination agent through the filter, including the membrane.

20 Claims, 10 Drawing Sheets

METHODS OF FLUORINATING FILTERS USED IN THE MANUFACTURE OF A SEMICONDUCTOR DEVICE

CROSS-REFERENCE TO RELATED APPLICATIONS

This application claims priority under 35 U.S.C. § 119 to U.S. Provisional Patent Application No. 62/570,078, filed on Oct. 9, 2017, the disclosure of which incorporated by reference herein in its entirety.

TECHNICAL FIELD

The present disclosure relates to methods of modifying filters used for manufacturing semiconductor devices with the filters formed from organic polymers that have a surface modified by fluorination.

BACKGROUND

It can be desirable to keep certain materials (gases, particles, and other foreign objects) from contaminating wafers in the method of manufacturing semiconductor devices. In a variety of processes, filters are installed to prevent contamination from gases and liquids used within tools used to manufacture semiconductor devices from reaching the wafer. Such filters may be modified to control chemical interactions of the filter by modifying the surface of the filter via fluorination processes. However, fluorination processes require exposing the filter to fluorination agents which can damage the filter's bulk properties such as tensile strength, as well as cause particle formation which may contaminate semiconductor manufacturing processes.

SUMMARY

Exemplary embodiments of the inventive concept provide improved filters for manufacturing semiconductor devices by modifying surfaces of the filters via fluorination. In accordance with an aspect of the inventive concept, a semiconductor filter may be treated by fluorinating the surface of the filter. The filter has a polymer membrane held by a support structure within the filter's housing. The housing has an inlet and an outlet for fluids being filtered, with the membrane held between the inlet and the outlet. The support structure holds the membrane such that fluids flowing through the filter pass through the membrane. The treatment purges air from the filter before flowing a gas mixture including a fluorination agent through the filter, including the membrane. After flowing the fluorination agent, a second purge may be purge the gas mixture including the fluorination from the filter. Purging may be done by flowing a purge gas, such as nitrogen. The gas mixture may also use an inert gas such as nitrogen as the carrier gas. A purge gas may be flowed for between 3 and 4 filter volumes during each purge. The fluorination agent may be fluorine gas at less than 0.01% by volume, and may be fluorine gas at 0.0025% by volume. The gas flow rate may be constant at 20 liters per minute for both the fluorination and purge, with the purge lasting for one minute. The fluorination may last for less than 1 minute, less than 30 seconds, or for about 10 seconds. The process may take place at room temperature and ambient pressure.

In accordance with an aspect of the inventive concept, a filter may be treated. The filter includes a polymer membrane held by a support structure within a housing enclosing both the polymer membrane and the support structure. The housing includes an inlet and an outlet. The support structure holds the polymer membrane between the inlet and the outlet of the housing such that fluid flowing through the filter passes through the polymer membrane. The filter treatment requires removing the oxygen-containing gases from within the housing. After removing the oxygen-containing gases, a fluorination agent is flowed from the inlet to the outlet through the polymer membrane. The fluorination agent is a gas mixture of fluorine gas mixed with an inert gas. After the fluorination agent is flowed, the fluorine gas is removed from within the housing. The polymer membrane, the housing, and the support structure may all comprise ultra-pure polyethylene. The oxygen-containing gases and fluorine gas may be removed from the housing by flowing an inert gas through the housing.

In accordance with an aspect of the inventive concept, a method requires obtaining a filter used in semiconductor photolithography. The filter includes a membrane held within a housing by a support structure. The housing includes an inlet and an outlet for fluid flow through the filter. Fluid flowing through the filter flows in the inlet, through the membrane, and out the outlet. The filter is fluorinated by flowing an inert gas into the filter via the inlet and out via the outlet, then flowing a fluorination agent into the filter via the inlet and out via the outlet, then flowing inert gas into the filter via the inlet and out the filter via the outlet. The fluorination agent is a mixture of inert gas mixed with 0.025% by volume fluorine gas. After the filter is fluorinated, the filter is inserted into a semiconductor photolithography apparatus to filter photoresist. The filter may be inserted at the point of use or the point of distribution for photoresist. The housing may be made of weldable thermoplastic, while the membrane is made of an organic polymer. The membrane and the support structure may remain within the filter during the fluorination process.

In accordance with an aspect of the inventive concept, a method of fluorinating a photoresist filter is disclosed. The filter includes a membrane mounted on a support structure within a housing. The housing has an inlet and an outlet, with the membrane and the support structure interposed between the inlet and the outlet. The method includes creating a pressure differential between the inlet side of the membrane and the outlet side of the membrane, flowing inert gas between the inlet side of the membrane and the outlet side of the membrane, mixing fluorine gas with the inert gas, then flowing inert gas mixed with the fluorine gas between the inlet and outlet side of the membrane.

In accordance with an aspect of the inventive concept, a filter may be created having a housing, a polymer membrane, and a support structure. The housing having an inlet and an outlet. The polymer membrane enclosed within the housing, and the support structure holding the membrane within the housing. The polymer membrane may be treated according to any of the methods or processes disclosed.

BRIEF DESCRIPTION OF THE DRAWINGS

The written disclosure herein describes illustrative embodiments that are non-limiting and non-exhaustive. Reference is made to certain of such illustrative embodiments that are depicted in the figures, as listed below.

DETAILED DESCRIPTION OF THE PREFERRED EMBODIMENTS

Various exemplary embodiments will be described more fully hereinafter with reference to the accompanying drawings. The present inventive concept may, however, be embodied in many alternate forms and should not be construed as limited to the example embodiments set forth herein. Rather, these example embodiments are provided so that this description will be thorough and complete, and will fully convey the scope of the present inventive concept to those skilled in the art.

Filters are used in semiconductor processing for a variety of purposes. A common purpose is to filter fluids applied within semiconductor processing apparatus to a semiconductor substrate, such as a wafer. A filter may prevent contamination coming in the upstream direction towards the source of the fluid. A filter may also prevent contamination from coming in the downstream reaction towards the processing chamber. A filter may also prevent both upstream contamination and downstream contamination at the same time.

The two mechanisms for filtering are sieving and non-sieving. In sieving filtration, particle contaminants are removed because they are larger than the pores in the filter membrane. In non-sieving filtration, contaminants are retained on the surface of the filter membrane through a physical and/or chemical interaction. Below a particle size of 65 nm, the non-sieving mechanism becomes predominant. The non-sieving mechanism is enhanced by introducing polar moieties on the filter membrane.

One convenient way of introducing polar sites on an organic polymer membrane is by fluorinating the surface from the gas phase. An adverse consequence of introducing polar sites is that the required time to prepare the filter is increased as the gas phase must be flushed from the filter. The present disclosure provides methods for modifying the surface properties of such structures without impacting the desirable bulk properties of the material such that the filter membranes require less time to be prepared and are more effective when used.

Filter Parts

A filter used to provide fluid filtration for semiconductor manufacturing includes generally three parts; a membrane, a housing enclosing the membrane, and a support structure for holding the membrane in the housing. The membrane, also known as the filter membrane, or polymer membrane, provides a surface to separate solids from a fluid flow fed through the filter.

Figure 1A:
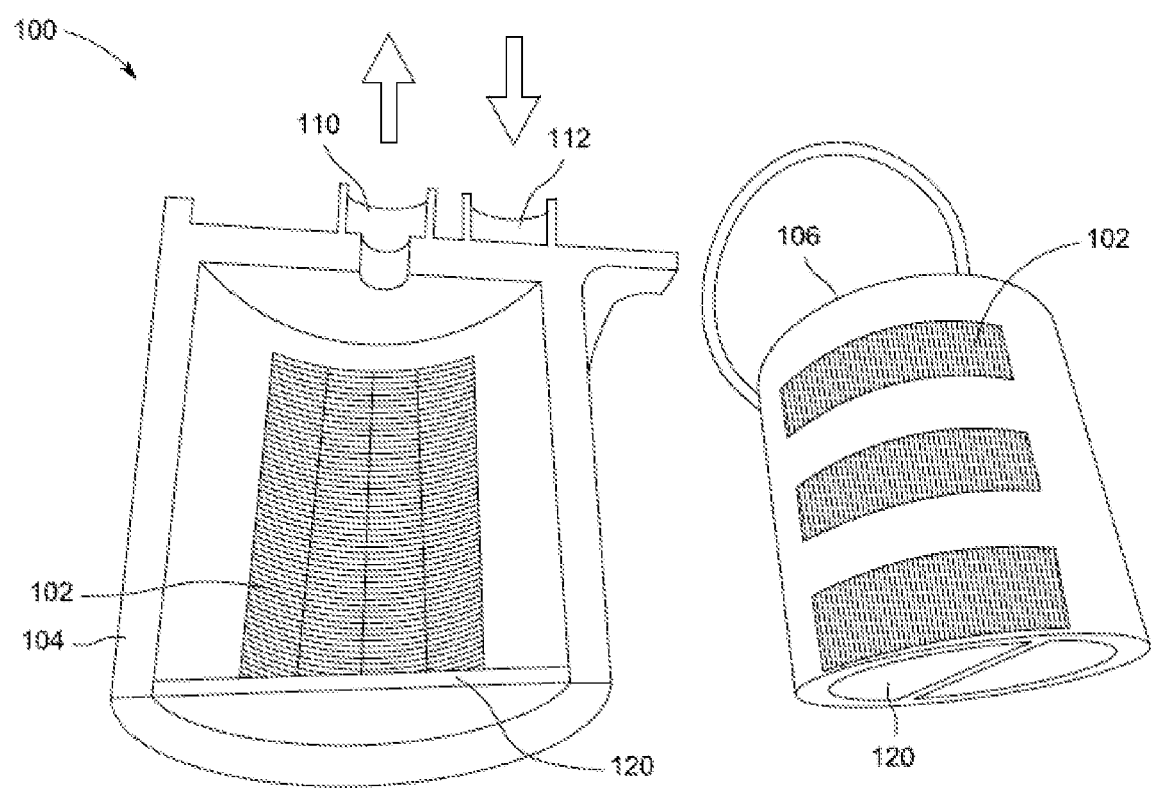
FIG. 1A is a cutaway view of a filter according to an exemplary embodiment of the present inventive concept.
Figure 1B:
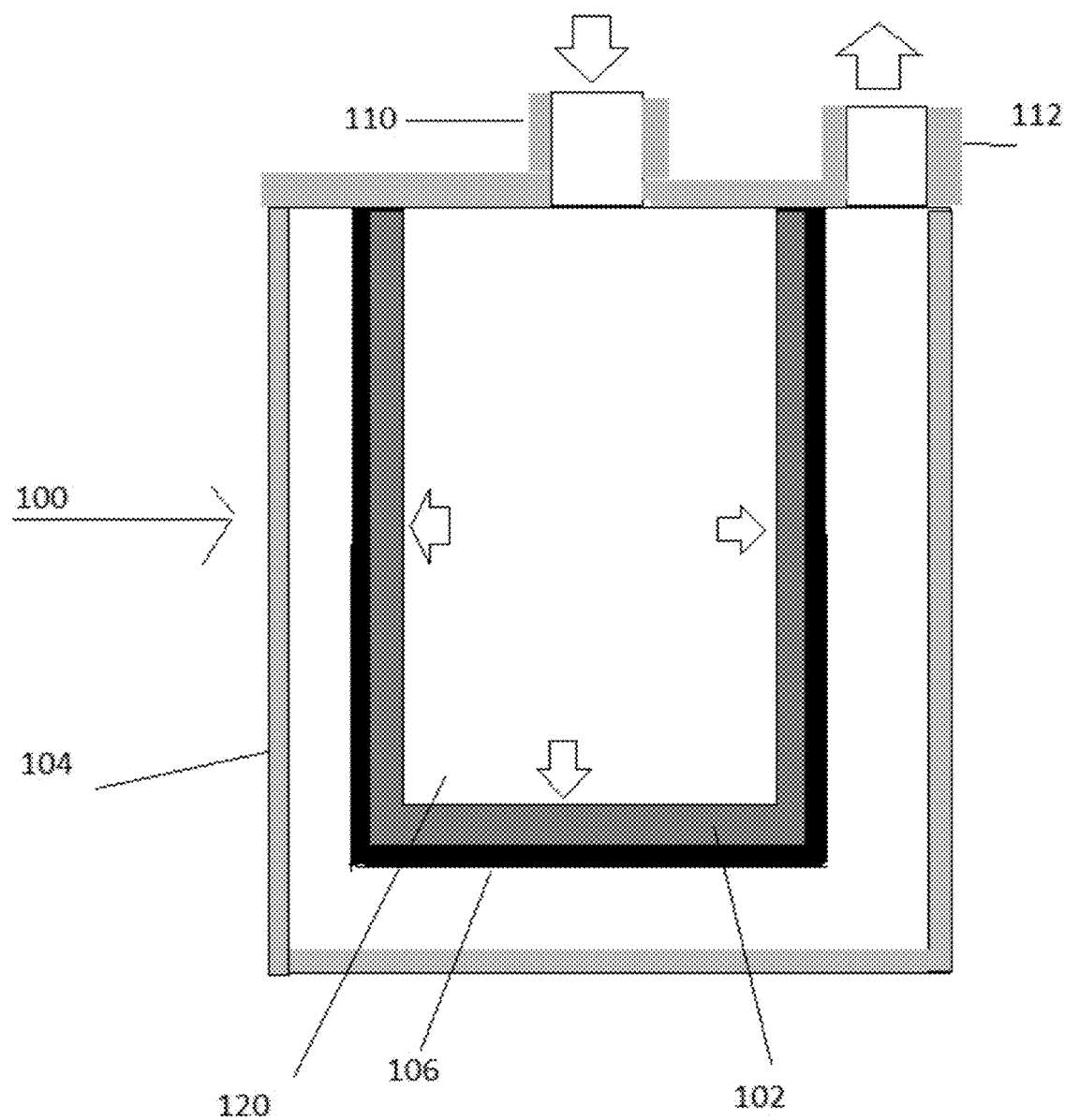
FIG. 1B is a plan view of the filter of FIG. 1A.

As shown in FIG. 1A and FIG. 1B, a filter 100 used to provide fluid filtration for semiconductor manufacturing includes a membrane 102, a housing 104 enclosing the membrane 102, and a support structure 106 for holding the membrane 102 in the housing 104. In the exemplary embodiment, the membrane 102 is the active surface for filtration, although in other embodiments the housing 104 or the support structure 106 may also act as filtration surfaces. The support structure 106 provides support for the membrane 102, and may mount the membrane 102 within the housing 104. The housing 104 provides for one or more inlets 110 and one or more outlets 112 for the filter 100. In order for the filter 100 to function as a filter, a fluid path through the filter 100 must flow through the membrane 102.

Figure 5:
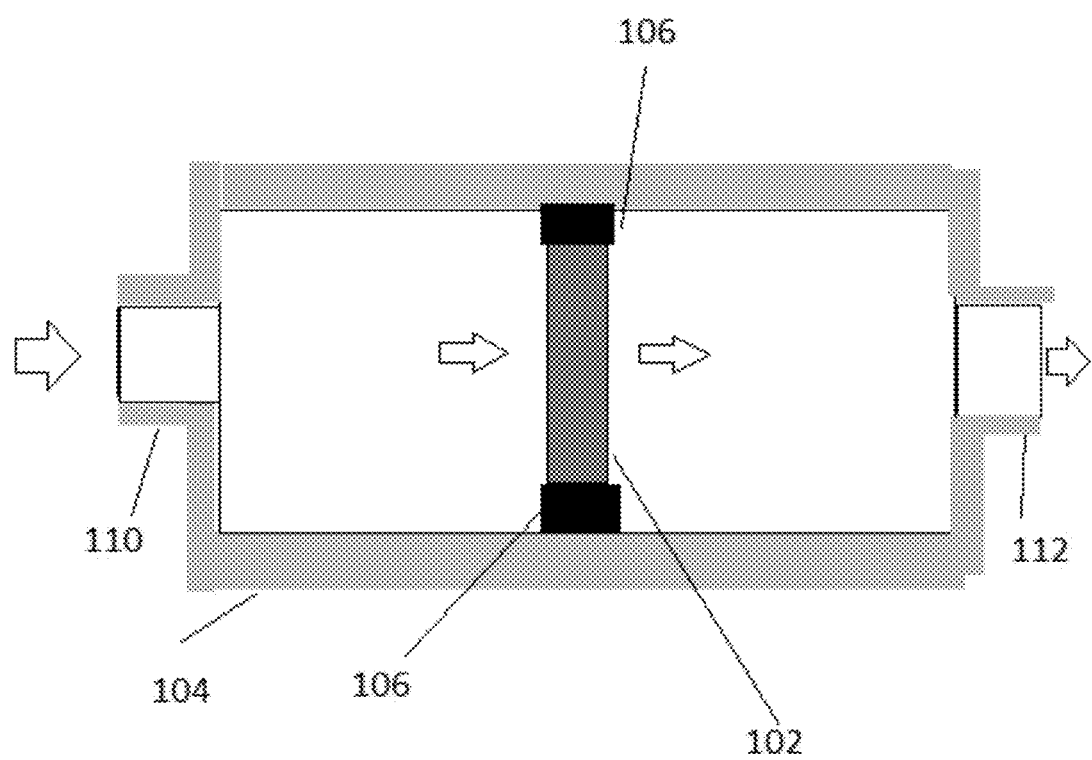
FIG. 5 is a schematic view of the process conditions for a filter according to an exemplary embodiment of the present inventive concept.

Although as shown in FIG. 1A and FIG. 1B, the filter 100 is shown as cylindrical, the actual shape of the filter may vary. In the exemplary embodiment of FIG. 1A and FIG. 1B, both the housing 104 and the membrane 102 are cylindrical. The support structure 106, shown removed from the housing 104 in FIG. 1A, holds the membrane 102 in place, and determines the actual shape that the membrane 102 will take. However, the many other shapes are known in the art, such as box filters, or inline pipe filters, such as shown in FIG. 5. Furthermore, while in the examples the housing 104 is shown with a single example of the inlet 110 and the outlet 112, additional openings may exist within the housing 104, including multiple inlets and outlets. For example, FIG. 2 demonstrates a filter 200 with a housing 209 featuring an inlet 201, an outlet 203, a vent 205, and a drain 207. The filter 200 differs only in the housing configuration compared to FIG. 1A and FIG. 1B, and may incorporate any other features of filter 100, such as the membrane 102, and the support structure 106. Grates, drains and vents, although not shown specifically, may exist in combination with any other embodiment of the filters described herein.

The membrane 102 is typically an organic polymer with a porous surface. As used herein, the membrane 102 may also be referred to as a filter membrane, or a polymer membrane, or an organic polymer membrane. The membrane 102 has a large surface area due to the size and number of pores therein. The pitch of the membrane 102 may vary. For example, the pitch may be 10 nm. The pitch may be decreased when a sieve is used with the filter 100. The filter 100 may be sieved or non-sieved. Alternatively, the pitch may be decreased when no sleeve is used. For example, a non-sieved filtration membrane may have a pitch of 14 nm, while a sieved filtration membrane may have a pitch of 35 nm.

The membrane 102 may comprise any suitable organic polymer. For example, the membrane 102 may comprise at least one selected from the group consisting of an aliphatic polymer, an aromatic polymer, a semi-aromatic polymer, polyolefin, polycarbonate, polystyrene, polyethylene, polypropylene, and nylon. Membranes formed of polyethylene or nylon may have polarization induced by treating such a membrane with fluorine. Such polar membranes include a polar gradient across the membrane 102 causing increased chemical interactions which in turn improve the filtration. Specific forms of polyethene such as ultra-pure polyethene (UPE), alternatively known as ultra-high-molecular-weight polyethene (UHMWPE or UHMW), as well as high density polyethene (HDPE), provide a good polarity when fluorinated, and are suitable for used in photoresist filtration. In further embodiments a pre-fluorinated polymer such as Polytetrafluoroethylene (PTFE), may be used for particular reactive processes and be combined with a non-fluorinated filter.

Figure 2:
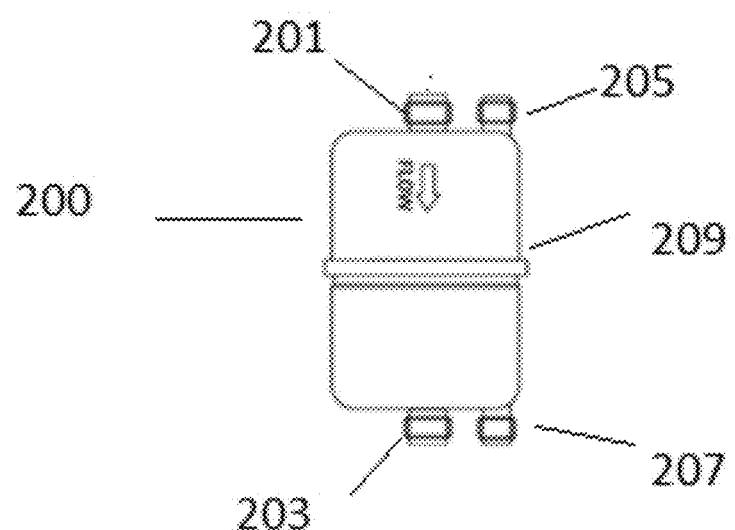
FIG. 2 is a schematic view of a filter according to an exemplary embodiment of the present inventive concept.

The support structure 106 may be unitary with the housing 104. Alternatively, the support structure 106 may be separate from the housing 104. The support structure 106 serves to hold the membrane 102 in place, providing proper filtration, as well as preventing air bubbles from forming. The support structure 106 is designed so the membrane 102 may be quickly connected or disconnected, and holds the membrane physically, rather than using chemical bonding. As shown in the exemplary embodiment of FIG. 1A and FIG. 1B, the housing 104 provides the general structure to direct fluid flow in and out of the filter 100, and encapsulates the membrane 102 and the support structure 106. The housing 104 has at least two ports i.e., the inlet 110 and the outlet 112. As shown in the exemplary embodiment, the inlet 110 and the outlet 112 may be placed on the same side of the housing 104, however the inlet 110 and the outlet 112 may be on adjacent or on opposing sides of the housing 104. The housing 104 may further contain additional ports for use as a drain, vent, or grate. For example, as shown in FIG. 2, a filter 200 with the housing 209 with the inlet 201, the outlet 203, the vent 205, and the drain 207.

The filter volume comprises a volume enclosed by the housing 104, between the inlet 110 of the housing 104 and the membrane 102, including any support structure (e.g. the support structure 106). For example, as shown in FIG. 1A and FIG. 1B, the filter 100, including the housing 104, the support structure 106, and the membrane 102, comprises a cylindrical shaped filter with the filter volume 120 as the volume between the inlet 110 and the membrane 102. The filter volume 120 is the volume of the inner cylinder formed by the support structure 106 and the membrane 102 as shown in the insert of FIG. 1A and FIG. 1B. However, in other embodiments, the shape of the support structure, the housing 104, and the membrane 102 may vary, with the filter volume 120 correspondingly varying.

The material making up the support structure 106 and the housing 104 are comprised of weldable thermoplastics. The housing 104 may be welded to form a proper fluid connection by heating a thermoplastic sufficiently. Furthermore, the support structure 106 may be welded to the housing 104. Alternatively, the support structure 106 may include a quick connect mechanism to allow replacement of the support structure 106 and the membrane 102. The thermoplastic comprising the housing 104 and or the support structure 106 the may further comprise an organic polymer. In an exemplary embodiment, the thermoplastic may comprise polypropylene or ultra-pure polyethene (UPE).

Fluorination Theory

Filter membranes comprised of non-fluorinated materials, such as UPE or HDPE, are widely available, easy to produce in desired shapes, desired pitches, and desired quantities. However, such membranes may easily react when exposed to reactant fluids due to the relatively low surface energy of the membrane. By fluorinating a portion of the membrane 102 of the filter 100 at the surface and just below the surface, the surface energy of a polymer like polyethylene increases to more than 40 mN/m. The increased surface energy resulting from fluorination enhances particle adhesion, improving the filter performance.

An exemplary embodiment of the fluorination process is shown for polyethene below. Fluorination will replace individual hydrogen atoms in the membrane 102 with fluorine atoms. Some previously positively charged hydrogen atoms will be replaced with negatively charged fluorine atoms, causing a polar gradient to form, increasing the chemical reactivity of the now fluorinated chemical.

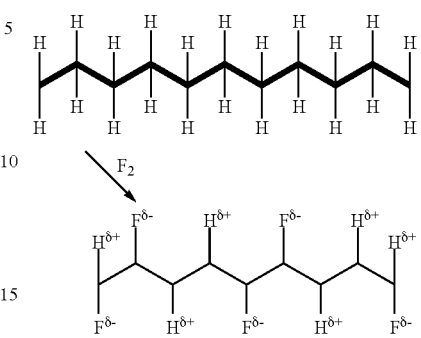

Fluorinating the membrane 102 of the filter 100 however, may negatively impact the tensile strength of the membrane surface, as well as the retention ability of the membrane 102. Furthermore, fluorination may produce leachable matter from the membrane, causing contamination when the membrane 102 is installed within a semiconductor processing apparatus. Such semiconductor processing apparatuses in which the filter 100 may be used are any which apply a fluid, for example photolithography process apparatuses flowing photoresist, clean steps using deionized water such as in an RCA cleaning process, etch steps such as using a wet etch, as well as wherein the gas is a fluid such as filtering gases used in diffusion.

Fluorination requires exposing the membrane 102 to a fluorination agent. The most effective fluorination agent for the membrane 102 is fluorine gas ($F_2$), used within the exemplary embodiments herein. Other fluorination agents are possible for use in other embodiments, such as arsenic trifluoride and other known fluorination agents. However, fluorine gas is highly reactive and requires dilution with a second gas, an inert carrier gas. In embodiments with fluorination agents other than fluorine gas, additional precautions beyond dilution may be required, such as lowering the temperature of fluorination. In the exemplary embodiments shown herein, nitrogen gas is used as the inert carrier gas, however any inert gas may be used, including argon, helium, and other noble gases.

Purge Theory

Conventional fluorination processes have a serious drawback, the presence of oxygen within the filter during the fluorination step. Oxygen containing gasses produces free radicals when exposed to fluorine, and thus when oxygen-containing gasses are present in the filter, an ongoing reaction may continue long after fluorination agents are applied. These oxygen-containing gases include not only oxygen, but also other oxygen-containing gases, such as carbon dioxide, carbon monoxide, water vapor, nitrous oxide, nitrogen dioxide, etc. The membrane 102 of the filter 100 is a porous web and a continuing reaction caused by free radicals weakens the individual strands forming the web, lowering tensile strength of the membrane 102. A lower tensile strength in turn impacts the lifetime of the membrane, as well as the pressure drops and flow rate the membrane 102 may experience.

In an exemplary embodiment, oxygen-containing gases are removed from the filter prior to fluorination. A first purge removes oxygen-containing gases within the filter, also known as the oxygen purge. After the first purge, a fluorination agent causes fluorination within the filter. After fluorination, a second purge, known as the fluorine purge, removes the fluorination agent from the filter before oxygen-containing gases are allowed to re-enter the filter.

In an exemplary embodiment, the oxygen purge and the fluorine purge may comprise identical processes. In other embodiments, the oxygen purge and the fluorine purge may use differing processes. The purges may comprise purge gases flooding the filter. Alternatively, the purges may comprise exposing the filter to vacuum. In additional embodiments, the purges may comprise flooding the filter with a purge gas and exposing the filter to vacuum, either alternating in time, or simultaneously. In exemplary embodiments the purge gas comprises nitrogen gas ($N_2$). However, any inert gas, such as a noble gas like Argon (Ar), or Helium (He), may be used, either alone or in combination with another inert gas, as the purge gas.

Figure 3:
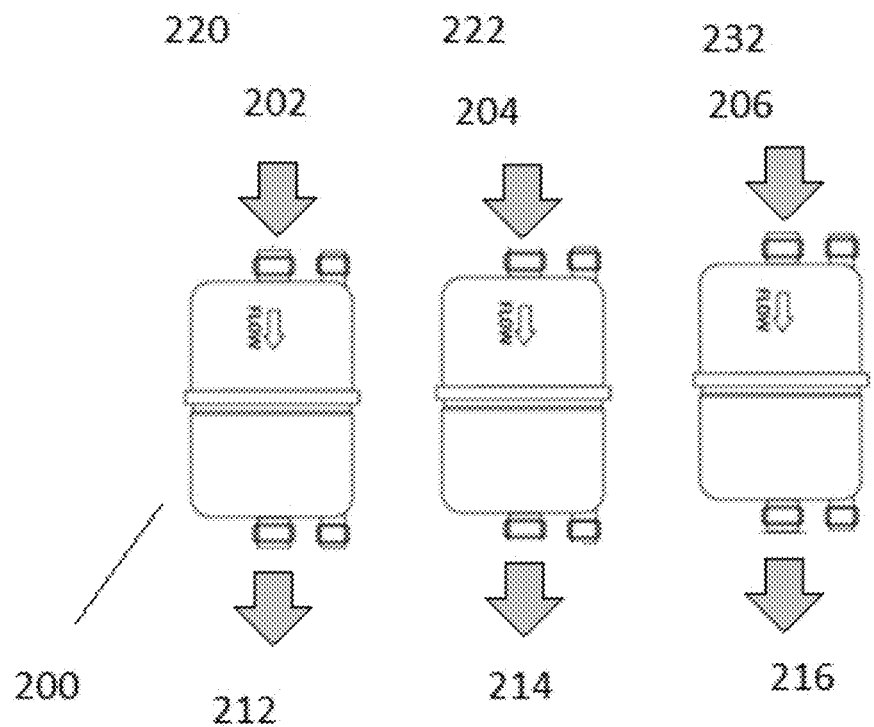
FIG. 3 is a schematic view of various flow conditions for the filter of FIG. 2.

In the embodiment of FIG. 3, the filter 200 is shown in three different states. At a first state 220, a purge gas 202 enters filter 200, causing oxygen-containing gases to be expelled from the filter 200 at exhaust 212. At a second state 222, a fluorination agent 204 may be added into the filter, so exhaust 214 will comprise purge gas and fluorination agent 204. At a third state 232, purge gas 206 is applied, causing the fluorination agent 204 to be expelled from the filter 200 as exhaust 216. After the third state 232, the filter 200 may then be exposed to oxygen-containing gases, such as those commonly found in the atmosphere. In another exemplary embodiment, the same states may be applied to filter 100.

Figure 8:
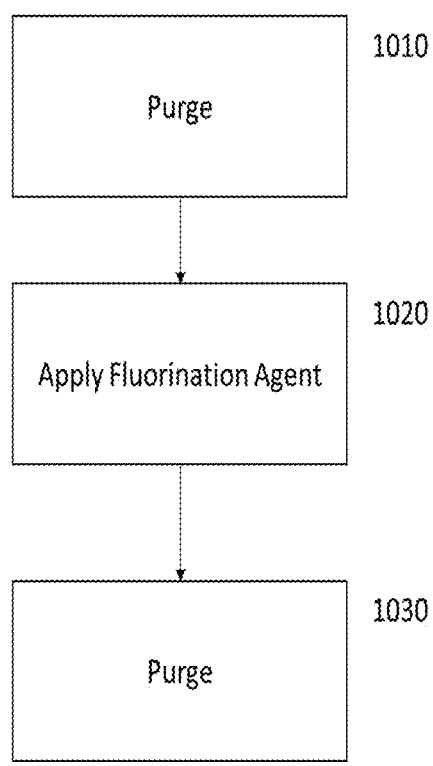
FIGS. 8 and 9 are flow charts of a method of fluorinating a filter according to an exemplary embodiment of the present inventive concept.

FIG. 8 demonstrates the purge process more generally. A first purge 1010 occurs. The first purge 1010 may use a purge gas, such as an inert gas like nitrogen, or the first purge 1010 may use a vacuum, with the purge removing oxygen-containing gases from the filter. At 1020, a fluorination agent is applied to the filter. The applied fluorination agent 1020 may comprise fluorine gas mixed with a second gas, such as inert nitrogen gas. At 1030 a second purge occurs. The second purge 1030 may use a purge gas, such as an inert gas like nitrogen, or the second purge 1030 may use a vacuum, with the purge removing the fluorination agent from the filter.

The amount of gas used in an oxygen purge (e.g., as with the first purge 1010) is at least 3-4 times the volume of the filter, which removes a sufficient amount of oxygen to eliminate the free radical problem forming when fluorine enters the filter. The amount of gas used in a fluorine purge (e.g., as with the second purge 1030) is at least 3-4 times the volume of the filter, which removes a sufficient amount of fluorine to eliminate the free radial problem when fluorine leaves the filter, and the filter is exposed to air.

Holding

Figure 4:
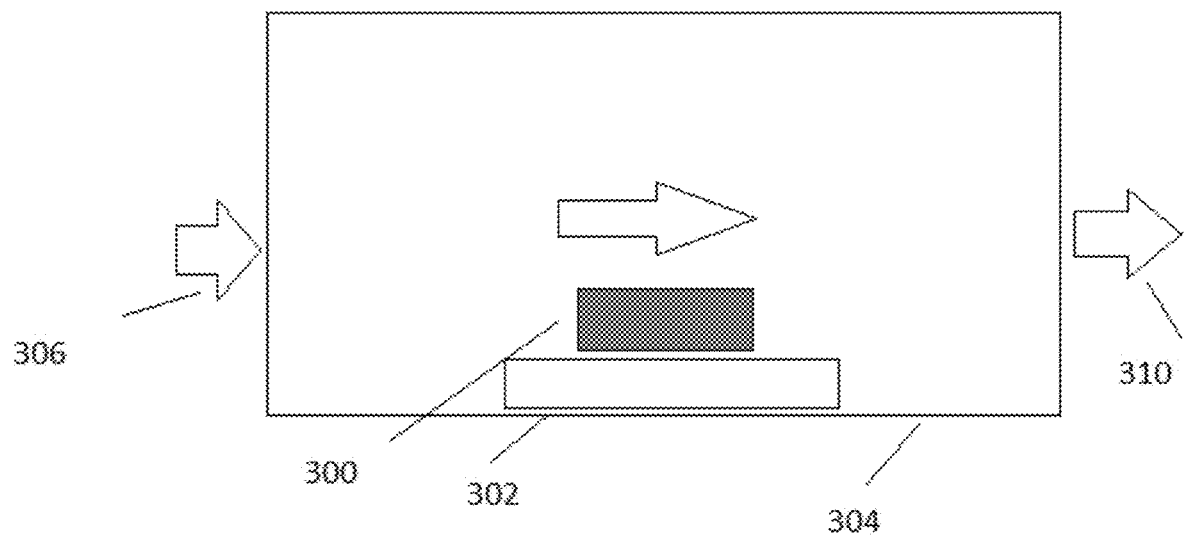
FIG. 4 is a schematic view of the process conditions for a prior art membrane.

In prior art processes, as shown in FIG. 4, a membrane 300 is removed from its filter and placed on a support 302 within a reaction chamber 304 where the fluorination agent is subsequently passed over the surface of the membrane 300. The fluorination agent passes over the top surface of the membrane 300 while another surface is kept on the support 302. Thus, the flow of fluid between an inlet 306 of the reaction chamber 304 and an outlet 310 of the reaction chamber 304 flows around the membrane 300. Thus, to properly fluorinate the membrane requires significant exposure of the membrane 300 to the fluorination agent, requiring a processing time sufficient to allow the agent to permeate the membrane 300 via diffusion, as well as a high enough concentration of the fluorination agent to ensure permeation. Such an increased exposure weakens the tensile strength of the membrane 300, and will produce excessive leachable contaminates.

As disclosed herein, the filter, and its components (including the aforementioned the membrane 102, the support structure 106, and the housing 104), may be fluorinated without removing the membrane 102 from the filter 100. The fluorination agent enters the inlet 110 of the housing 104 and exits the outlet 112 of the housing 104 by a fluid path through the membrane 102. The membrane 102 thus forms a permeable barrier between side of the inlet 110 and the side of the outlet 112 of the filter 100. When the fluorination agent comprises fluorine gas mixed with a second gas, the mixed gas must travel through the membrane 102 when flowed through the filter, requiring the gas to penetrate the membrane 102. The fluorination agent in the present inventive concept is actively forced to permeate the membrane 102, while the prior art uses diffusion. The present inventive concept thus requires significantly less fluorination agent and less time to properly fluorinate the membrane 102.

For example, FIG. 1A, FIG. 1B, and FIG. 5 show representations of the filter 100 where the membrane 102 is has the fluorination agent applied while the membrane 102 is present within the filter 100. The membrane 102 is held within the housing 104 by the support structure 106. The membrane 102 then acts as a permeable partition between the inlet 110 and the outlet 112, requiring flowing gases entering the inlet 110 to travel through the membrane 102 to reach the outlet 112. The membrane 102 may create a pressure differential between the side towards the inlet 110 and the side towards the outlet 112. This pressure differential may be increased by the flow of gas entering the inlet 110, as well as by applying vacuum at the outlet 112. Although FIG. 1A and FIG. 1B demonstrates the filter 100 in the form of a cylinder, and FIG. 5 demonstrates the filter 100 in the form of a pipe, the filter and its components may use any shape known in the art, including the box shape of the filter 200.

Fluorinating the filter when the membrane 102 is held by the support structure 106 creates a fluid path that requires the fluorination agent to travel through the membrane 102. Although cylindrical, box, and pipe shapes are shown in exemplary embodiments, the shape of the filter 100 is intended as merely exemplary, with the shapes of each of the elements of the filter 100 allowed to vary so long as the membrane 102 remains a porous barrier perpendicular to the flow of fluid within the filter 100.

Flow Conditions

The filter 100 comprising the membrane 102, the support structure 106, and the housing 104 is treated by purging the filter 100 with a purge gas comprising inert nitrogen gas. After the purge gas removes oxygen-containing gases from within the filter 100, a fluorination agent is applied by flowing a gas mixture comprising fluorine gas mixed with inert nitrogen gas. After enough fluorination agent is applied, the filter 100 has a second purge gas to purge the fluorine gas from the filter 100. The second purge gas is again inert nitrogen gas.

An exemplary filter 100 has the filter volume 120 of 250 mL. However, the filter volume 120 may range depending on the use of the filter 100. For example, filters 100 designed for use at the point of use in semiconductor manufacturing may have a volume between 25 mL and 1 L. However, the filter 100 designed for use in at the point of distribution in semiconductor manufacturing may have a volume between 1 L and 5 L. Thus, filter volumes 120 may vary between 25 mL and 5 L.

A purge requires approximately 3-4 filter volumes of purge gas to flow to adequately purge a filter. Since the filter volume 120 may vary between 25 mL and 5 L, between 75 mL and 20 L of purge gas is required to adequately purge the filter 100. In an exemplary embodiment, a constant fluid flow rate of 3-4 filter volumes per minute is used to purge the filter 100. In another exemplary embodiment, a constant fluid flow rate of 20 liters per minutes is used to purge the filter 100.

The flow rate of gases used herein may be controlled by mass controllers. The gas flow rates are selected to provide conditions suitable for any of the filter volume 120 which range between 25 mL and 5 L. A minimum of 3-4 filter volumes is required to adequately purge gas from the filter 100, thus requiring 20 L of purge gas to ensure the filter 100 is purged. The flow rate of the purge gas is a tradeoff between rapidity of purging, and possible damage to filters in smaller volumes. 60 seconds is often sufficient to avoid damage. Thus, the purge gas flow rate is 20 L/Min. However, the flow rate may vary in other embodiments, as the filter conditions require.

Flowing the nitrogen gas for 60 seconds at 20 L/minute with the filter volume 120 of 250 mL comprises approximately 80 filter volumes. The full range of purge volumes for filter volumes between 25 mL and 5 L thus extends from as few as 4 filter volumes to as many as 800 filter volumes.

As fluorine gas requires dilution within an inert carrier gas to be used as an effective fluorination agent, fluorine gas may be added to the purge gas to begin fluorination. For example, after flowing nitrogen purge gas for 60 seconds in the oxygen purge, fluorine gas may be added to the nitrogen gas. The fluorine gas may be added by the means of a mass controller. Ending the fluorination process and beginning the fluorine purge may comprise halting the addition of fluorine gas to the purge gas. Thus, in an exemplary embodiment, nitrogen gas may flow at a constant rate between the oxygen purge, fluorination flow, and fluorine purge, with the fluorination flow being defined as the duration where fluorine is allowed to mix with the nitrogen gas flowing into the filter. The amount of fluorine gas added to flow with the inert carrier gas may be varied to control for the concentration of the gas. Further, the duration of the fluorination flow may also be controlled.

As detailed below, the fluorination process includes flowing a mix of an inert gas mixed fluorine gas with at concentration of below 0.1% by volume. The gas mix is then flowed for 60 seconds or less. The gas flow rate is at 20 L/Min in the exemplary embodiments. The gas flow rate may be, however, adjusted based on filter capacity. Flowing the fluorine gas for 10 seconds at 20 L/minute with the filter volume 120 of 250 mL comprises approximately 3.34 filter volumes of fluorine flowed via the filter. The full range of the filter volume 120 ranges between 25 mL and 5 L and at flow times between 10 seconds and 60 seconds thus presents as many as 133.34 filter volumes to as low as 0.66 filter volumes of fluorine may be used.

Figure 9:
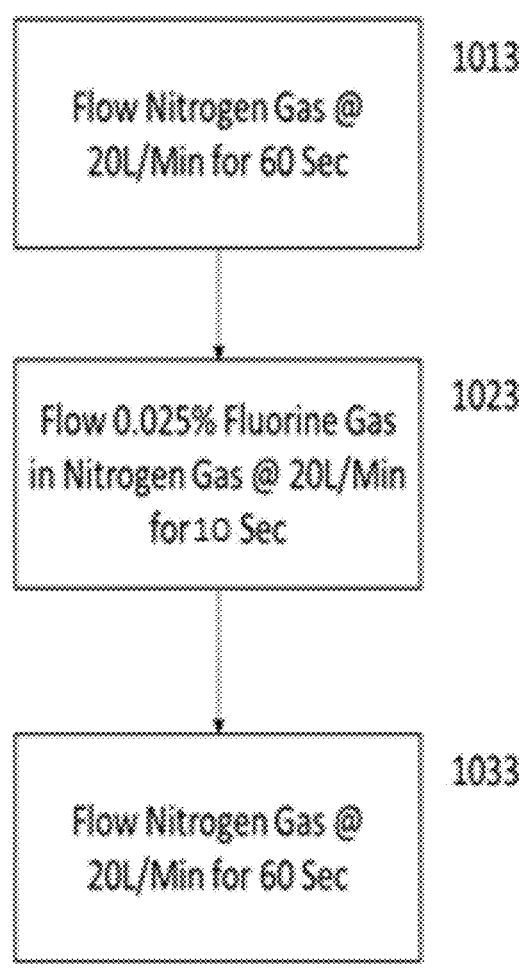

In the exemplary embodiment of FIG. 9, a first purge 1013 comprises flowing nitrogen gas at 20 L/Min for 60 seconds. A fluorination 1023 comprises flowing nitrogen gas at 20 L/Min with a concentration of 0.025% by volume fluorine gas for 10 seconds. A second purge 1033 comprises flowing nitrogen gas at 20 L/Min for 60 seconds. In this exemplary process, the first purge 1013, the fluorination 1023 and the second purge 1033 are all performed using a constant flow of nitrogen with the transition between the purges and the fluorination being the addition and the removal of fluorine gas to the gas flow. That is, immediately after the first purge gas flow 1013, the fluorination 1023 flows fluorine through the filter 100 from the inlet 110 to the outlet 112 through the membrane 102. Then, immediately after flowing the fluorine gas in the fluorination 1023, the second purge flows through the filter 100 from the inlet 110 to the outlet 112 through the membrane 102.

Fluorination Examples

In the following examples the filter 100 has a volume of 250 mL and uses a polymer for the membrane 102, such as ultra-pure polyethylene (UPE), held in the housing 104 formed of ultra-pure polyethylene (UPE) by the support structure 106 formed of ultra-pure polyethylene (UPE). The filter 100 undergoes a 60 second purge using nitrogen gas before fluorination, and the filter 100 experiences a second 60-second purge using nitrogen gas after fluorination. Fluorination comprises flowing fluorine gas for set times at set concentrations in nitrogen gas. The gas flow rate for the examples is 20 L/Min, and is held at a constant flow rate.

Example 1

In a first example, fluorine gas is flowed for 10 seconds at a concentration of 0.025% by volume in nitrogen gas. The total process time is 130 seconds, comprising a first purge gas flow of nitrogen gas for 60 seconds, followed by 10 seconds of fluorine diluted in nitrogen at a concentration of 0.025%, followed by a second purge gas flow of nitrogen gas for 60 seconds.

The first example membrane had good characteristics for integrity, flow, metal contamination, tensile strength, non-volatile residues (NVR), and retention.

Example 2

In a second example, fluorine gas is flowed for 60 seconds at a concentration of 0.025% by volume in nitrogen gas. The total process time is 180 seconds, comprising a first purge gas flow of nitrogen gas for 60 seconds, followed by 60 seconds of fluorine diluted in nitrogen at a concentration of 0.025% by volume, followed by a second purge gas flow of nitrogen gas for 60 seconds.

The second example membrane had good characteristics for integrity, flow, metal contamination, NVR, and retention. However, the second example membrane had impaired tensile strength.

Example 3

In a third example, fluorine gas is flowed for 10 seconds at a concentration of 0.075% by volume in nitrogen gas. The total process time is 180 seconds, comprising a first purge gas flow of nitrogen gas for 60 seconds, followed by 60 seconds of fluorine diluted in nitrogen at a concentration of 0.075% by volume, followed by a second purge gas flow of nitrogen gas for 60 seconds.

The third example membrane had good characteristics for integrity, flow, metal contamination, NVR, and retention. However, the third example membrane had significantly impaired tensile strength, resulting in a clearly impaired membrane.

Example 4

In a fourth example, fluorine gas is flowed for 360 seconds at a concentration of 0.075% by volume in nitrogen gas. The total process time is 480 seconds, comprising a first purge gas flow of nitrogen gas for 60 seconds, followed by 360 seconds of fluorine diluted in nitrogen at a concentration of 0.075% by volume, followed by a second purge gas flow of nitrogen gas for 60 seconds.

The fourth example membrane had good characteristics for flow and non-volatile residues (NVR). However, the fourth example membrane had impaired tensile strength, integrity, metal contamination, and was unable to retain particles, making resulting in an unusable membrane.

As per above, the most optimal conditions with respect to membrane integrity, flow, metal contamination, tensile strength, non-volatile residues (NVR), and retention were found by flowing a concentration of 0.025% by volume fluorine for ten seconds. Continuing to flow the fluorine at the same concentration for 60 s caused the tensile strength of the membrane to degrade without providing improvements to any other category.

The fluorination process may penetrate the surface of the membrane 102. In an exemplary embodiment, the membrane 102 comprised of UPE is exposed to 0.025% by volume fluorine for 10 seconds, with fluorine penetrating to a depth of 10 nm. Fluorine will also penetrate the surface of the housing 104 and the surface of the support structure 106. However, the membrane 102 will experience a deeper penetration of fluorine due to the membrane 102 having a large surface area, caused by the surface being porous. Further, the fluorination agent is actively flowed through the membrane 102, ensuring the membrane 102 is penetrated by the agent, while the fluorination agent contact with the housing 104 and the support structure 106 is at non-porous surfaces which require diffusion of the agent.

The fluorination processes under these flow conditions are readily suitable for a wide variety of materials and conditions. Furthermore, the fluorination processes in the examples took place at room temperature and a process pressure of ambient room pressure, which are approximately 25 degrees Celsius and approximately 1 bar. In other embodiments, the temperature may vary from ambient, such as between 0-50 degrees Celsius. In further embodiments, the pressure may vary, between 1 millibar and 10 bars. In still other embodiments, the pressure and the temperature may both vary.

System Set Up

The filter 100 may filter fluids at a point of use (POU) within a semiconductor processing system, or the filter 100 may filter fluids at a point of distribution (POD) for a semiconductor processing system, or multiple filters 100 may be installed to filter at both the point of use and the point of distribution. Furthermore, filters at the point of distribution may filter fluids for multiple semiconductor system sharing a central source.

Figure 6:
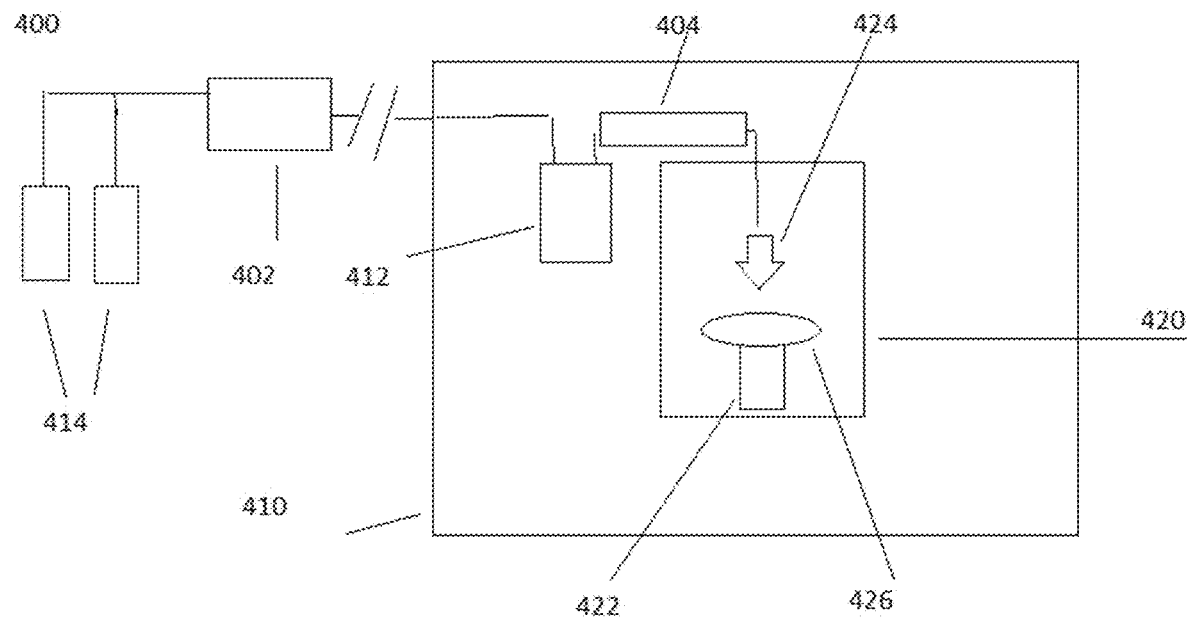
FIG. 6 is a schematic view of a semiconductor processing system using a filter according to an exemplary embodiment of the present inventive concept.

In an exemplary embodiment shown in FIG. 6, the filter 100 may be used in a photolithography system 400 to filter photoresist applied to a semiconductor wafer 426. The filter 100 may comprise a photoresist filter. The photolithography system 400 includes one or more of a photoresist dispensing apparatus 410 containing a processing chamber 420, with the processing chamber 420 including a nozzle 424 for applying photoresist to a semiconductor wafer 426 on a platform 422. Also within the photolithography system 400 is a filter at the point of use (POU) or a POU filter 404, which is fluidically coupled just upstream from nozzle 424. Additional components 412 such as bubble filters, pumps, heaters, etc. are upstream of the POU filter 404. Photoresist is fed to the photoresist dispensing apparatus 410 from a photoresist source 414, for example comprising bottles of photoresist. Between the photoresist source 414 and the photoresist dispensing apparatus 410 is a filter at the point of distribution (POD) or a POD filter 402. While only shown as a single filter, both the POU filter 404 and the POD filter 402 may comprise a plurality of filters.

The POU filter 404 provides filtration at the point of use (POU) from contaminates generated between the photoresist source 414 and the application of the fluid to the semiconductor substrate, such as the semiconductor wafer 426. The POU filter 404 ensures that contamination introduced within the processing chamber 420 may not travel further upstream, especially when the fluid source is shared between multiple photoresist dispensing apparatus 410. In the example of the photolithography system 400, the POU filter 404 ensures that contamination introduced into the processing chamber 420, such as metal particulates, is prevented from contaminating upstream elements of the photolithography system 400 such as additional components 412 such as pumps and bubble filters, or contaminating as far back as the photoresist source 414. Conversely, the POU filter 404 prevents contamination from upstream of the POU filter 404, from reaching a substrate, such as semiconductor wafer 426. In the example of the photolithography system 400, the POU filter 404 prevents contamination generated between the photoresist source 414 and nozzle 424 from reaching the semiconductor wafer 426, including from elements such as particles generated by additional components 412 such as pumps and bubble filters.

The POD filter 402 provides filtration at the point of distribution (POD) from contaminates within the photoresist source 414 from being distributed to the photoresist dispensing apparatus 410. The POD filter 402 also ensures that contamination originating within the photoresist dispensing apparatus 410 may not reach the photoresist source 414. In the example of the photolithography system 400, the POD filter 402 prevents contamination originating in the photoresist source 414, such as dried photoresist, from being distributed to each of the photoresist dispensing apparatus 410. Conversely, the POD filter 402 also prevents contaminates generated within the photoresist dispensing apparatus 410 from reaching the photoresist source 414 and spreading to other apparatuses.

In-Filter Fluorination

In the prior art where the membrane 300 is removed from the filter for the fluorination process, remounting the membrane 300 after fluorination is required. Thus, in the prior art process, additional cleaning steps are required due to contamination during the remounting process. The additional cleaning steps require exposing the membrane 300 to an acid mix, damaging the membrane 300.

In prior art processes, as shown in FIG. 4, the membrane 300 is removed from its filter and placed within the reaction chamber 304. Additionally, the membrane 300 is removed from any housing or support structure of its corresponding filter. Thus, the membrane 300 will require remounting the membrane 300 into its filter, and further require cleaning steps, detailed below, which expose the membrane 300 to acids which further degrade the membrane 300 and produces leachable contaminates.

The treatment of embodiments the present inventive concept described herein may be part of a greater process of preparing the filter 100 for use in the photolithography system 400. The preparation comprises first placing the membrane 102 and the support structure 106 into the housing 104 to create an assembled filter 100. The assembled filter 100 is then cleaned. The assembled filter 100 is the treated using the treatment process above, including purging the filter, fluorinating the filter, and purging the filter again to create a fluorinated filter. The fluorinated filter 100 is then optionally cleaned again before installed into the semiconductor process apparatus. In the exemplary example where the apparatus is the photoresist dispensing apparatus 410, the fluorinated filter 100 may be installed either as the POD filter 402 or as the POU filter 404 by welding the filter 100 into place at the appropriate place in the photolithography system 400.

Figure 10:
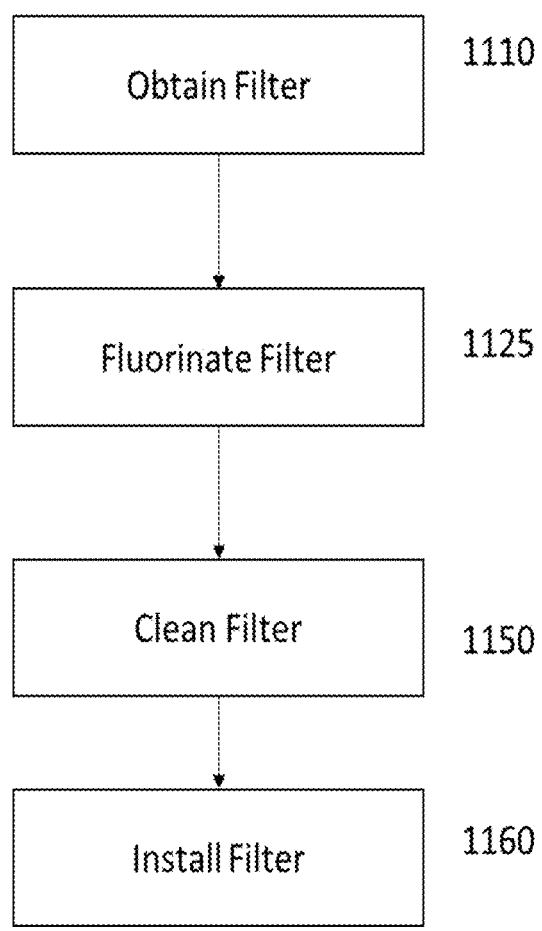
FIGS. 10 and 11 are flow charts of a method of preparing a filter according to an exemplary embodiment of the present inventive concept for installation within a semiconducting processing system.
Figure 11:
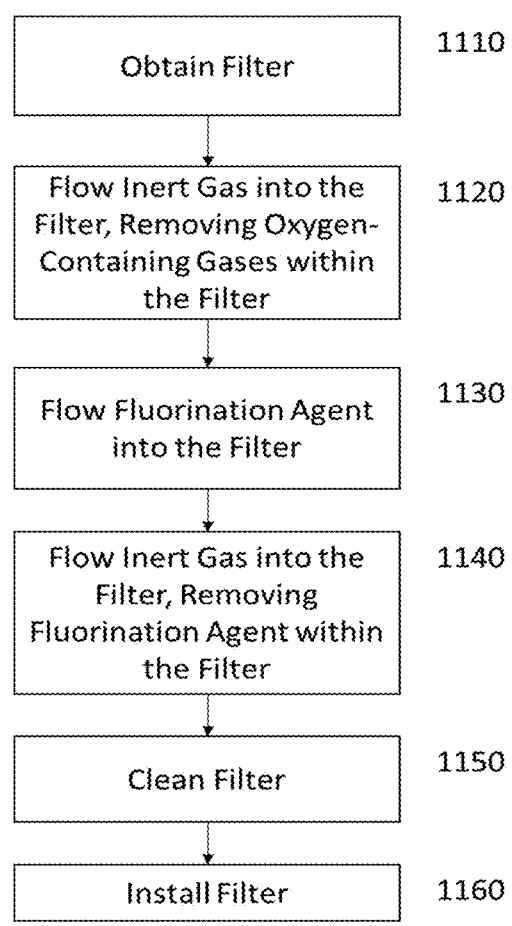

The treatment process may be as described in FIG. 10. The filter 100 for use in the photolithography system 400 is obtained at 1110. The filter 100 may comprise the housing 104, the membrane 102, and the support structure 106 as disclosed herein, where the housing 104 has the inlet 110 and the outlet 112 for fluid flow, and where fluid flow between the inlet 110 and the outlet 112 flows through the membrane 102. For example, the filter 100 of FIG. 1A may be used, although other exemplary filters may also be used. At 1125, the filter 100 is fluorinated by applying a fluorination agent. At 1150, an optional cleaning step is used to clean the filter. Then at 1160, the filter 100 is installed into the photolithography system 400. Fluorination 1125 may be further broken down into: a first purge 1120, where an inert purge gas is flowed into the filter to remove oxygen-containing gases within the filter 100; then, at 1130, a fluorination agent is flowed into the filter 100, the fluorination agent comprising a gas mixture of the inert gas mixed with less than 0.1% by volume of fluorine gas; then, at a second purge 1140, where the inert gas is flowed into the filter 100 to remove the fluorination agent within the filter 100. The first purge 1120 and the second purge 1140 may comprise flowing nitrogen gas at 20 L/Min for 60 seconds. The fluorination agent application 1130 may comprise flowing 0.1% to 0.025% by volume fluorine gas mixed with nitrogen gas at 20 L for 10-60 seconds.

Figure 7:
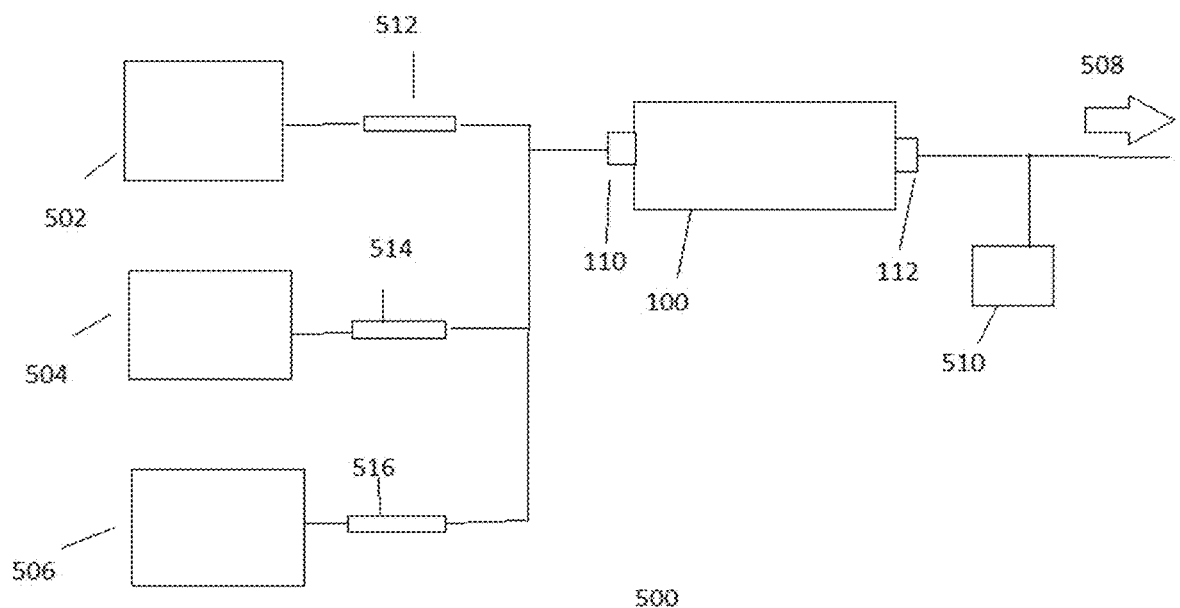
FIG. 7 is a schematic view of a system for fluorinating a filter according to an exemplary embodiment of the present inventive concept.

The treatment of embodiments of the present inventive concept described herein may use a system 500 as shown in FIG. 7. The filter 100 has the inlet 110 connected to at least one purge gas source 504 and a fluorine gas source 502. In the exemplary embodiment, the at least one purge gas source 504 is shown as a nitrogen gas source, however additional purge gas sources 506 may be used, with the purge gases comprising inert gases, such as nitrogen, argon, and other noble gases. The at least one purge gas source 504 and fluorine gas source 502 may be connected to the inlet 110 on the filter 100 via mass controllers. As shown in the exemplary embodiment, the fluorine gas source 502 has a mass controller 512, and the at least one purge gas source 504 has a mass controller 514. Additional purge gas sources 506 may each include a purge gas mass controller 516. The at least one purge gas source 504 and the fluorine gas source 502 may mix prior to entering the inlet 110 to the filter 100, such as with an optional mixing chamber. The outlet 112 for the filter 100 may be connected directly to an exhaust 508, which may comprise a scrubber or other method to deal with fluorination agents. Optionally, a vacuum 510 may be in fluid communication with the outlet 112 of the filter 100. Flowing inert gases may create a pressure drop at the membrane 102 between the inlet 110 and the outlet 112. Additionally, the vacuum 510 may be used to enhance the pressure drop. After treatment is complete, the filter 100 may be installed into the photolithography system 400, such as shown in FIG. 6, with the components of the filter 100 including the membrane 102, the support structure 106, and the housing 104 installed as a unit. The components of filter 100 thus may be fluorinated together, with the membrane 102 held within the housing 104 during the entire process from obtaining the filter 100 to installing the filter 100 in the photolithography system 400.

Cleaning

Cleaning of the filter can be performed prior to the membrane 102 being sent by the manufacture and after the fluorination process to remove contamination. It involves exposing the membrane 102 to a variety of acids, which the manufacture keeps propriety. A large advantage of this process is the fluorination can be done without removing the membrane 102 from the filter 100, avoiding contamination of the membrane 102, and thus reduce the amount of cleaning required. Since the cleaning is done with acid, the cleaning can damage the membrane 102 beyond the damage possible from fluorination.

While exemplary embodiments of the present inventive concept have been particularly shown and described, it will be understood by one of ordinary skill in the art that variations in form and detail may be made therein without departing from the spirit and scope of the attached claims.

The invention claimed is:

1. A method for treating a filter that comprises a polymer membrane having a plurality of pores defined therein, a housing enclosing the polymer membrane, and a support structure configured to hold the polymer membrane within the housing, the housing comprising an inlet and an outlet, the polymer membrane held by the support structure such that the polymer membrane acts as a permeable partition between the inlet and the outlet to partition an interior volume of the housing into a first interior volume located between a first side of the polymer membrane and the inlet and a second interior volume located at a second side of the polymer membrane and the outlet, and such that a fluid flow from the inlet to the outlet passes sequentially from the first interior volume, through the plurality of pores defined in the polymer membrane, and into the second interior volume, the method comprising:

creating a pressure differential within the housing between the first interior volume and the second interior volume;

performing a first purge by flowing a first purge gas from the inlet to the outlet through the plurality of pores in the polymer membrane; and after flowing the first purge gas, flowing a fluorination agent from the inlet to the outlet and through the plurality of pores in the polymer membrane, wherein the fluorination agent includes a gas mixture comprising a first gas mixed with a second gas, wherein the first gas includes fluorine.

2. The method of claim 1, further comprising immediately after flowing the fluorination agent, performing a second purge by flowing a second purge gas from the inlet to the outlet and through the plurality of pores in the polymer membrane.

3. The method of claim 2, wherein the first purge gas, the second gas, and second purge gas comprise nitrogen.

4. The method of claim 1, wherein the first purge is performed for 60 seconds.

5. The method of claim 1, wherein the fluorination agent is flowed for 10 seconds.

6. The method of claim 2, wherein the filter comprises a filter volume between 25 mL and 5 L, wherein performing the first purge comprises flowing between 3 and 4 filter volumes of the first purge gas through the filter, wherein flowing the fluorination agent comprises flowing between 0.5 and 0.667 filter volumes of the gas mixture, and wherein performing the second purge comprises flowing between 3 and 4 filter volumes of the second purge gas through the filter.

7. The method of claim 6, wherein the gas mixture comprises a nitrogen gas with 0.025% by volume fluorine gas.

8. The method of claim 6, wherein the method is performed at a constant fluid flow rate of 3-4 filter volumes per minute.

9. The method of claim 6, wherein the method is performed at a constant fluid flow rate of 20 liters per minute.

10. The method of claim 2, wherein the first purge, the flowing of the fluorination agent, and the second purge are performed at room temperature and a process pressure of ambient room pressure.

11. A method of treating a filter comprising a polymer membrane having a plurality of pores defined therein, a support structure configured to hold the polymer membrane within a housing, and the housing enclosing the polymer membrane and the support structure, wherein the housing comprises an inlet and an outlet, wherein the polymer membrane is held by the support structure such that the polymer membrane acts as a permeable partition between the inlet and the outlet to partition an interior volume of the housing into a first interior volume located between a first side of the polymer membrane and the inlet and a second interior volume located at a second side of the polymer membrane and the outlet, and such that a fluid flow from the inlet to the outlet passes sequentially from the first interior volume, through the plurality of pores defined in the polymer membrane, and into the second interior volume, and wherein the method of treating the filter comprises:
    creating a pressure differential within the housing between the first interior volume and the second interior volume;
    removing oxygen-containing gases from within the housing; and
        after removing the oxygen-containing gases, flowing a fluorination agent from the inlet to the outlet and through the plurality of pores in the polymer membrane, wherein the fluorination agent includes a gas mixture comprising fluorine gas mixed with an inert gas; and
        after flowing the fluorination agent, removing the fluorine gas from within the housing.

12. The method of claim 11, wherein the polymer membrane comprises ultra-pure polyethylene (UPE), and wherein the housing comprises ultra-pure polyethylene (UPE).

13. The method of claim 11, wherein the gas mixture comprises nitrogen gas mixed with 0.025% by volume of fluorine gas.

14. The method of claim 11, wherein flowing the fluorination agent through the polymer membrane is performed for 10 seconds or less.

15. The method of claim 11, further comprising fluorinating a surface of the polymer membrane to a depth of at least 10 nm by flowing the fluorination agent.

16. The method of claim 11, wherein the inert gas is nitrogen flowing at a constant rate while removing the oxygen-containing gases, flowing the fluorination agent, and removing the fluorine gas.

17. A method, comprising:
    obtaining a filter used in a semiconductor photolithography apparatus, the filter comprising a housing, a polymer membrane having a plurality of pores defined therein, and a support structure holding the polymer membrane within the housing;
    wherein the housing comprises an inlet and an outlet for fluid flow through the filter, and wherein fluid flow within the housing flows into the housing from the inlet, through the polymer membrane, and exits the housing through the outlet;
    wherein the polymer membrane is held by the support structure such that the polymer membrane acts as a permeable partition between the inlet and the outlet to partition an interior volume of the housing into a first interior volume located between a first side of the polymer membrane and the inlet and a second interior volume located at a second side of the polymer membrane and the outlet, and such that a fluid flow from the inlet to the outlet passes sequentially from the first interior volume, through the plurality of pores defined in the polymer membrane, and into the second interior volume;
    fluorinating the filter by fluorinating the housing, the polymer membrane, and the support structure;
    inserting the fluorinated filter into a semiconductor photolithography apparatus, wherein the polymer membrane filters a photoresist; and
    wherein fluorinating the filter comprises:
        creating a pressure differential within the housing between the first interior volume and the second interior volume;
        flowing an inert gas into the filter via the inlet, the inert gas exiting the filter via the outlet through the plurality of pores in the polymer membrane;
        after flowing the inert gas, flowing a fluorination agent into the filter via the inlet, the fluorination agent exiting the filter via the outlet, wherein the fluorination agent includes a gas mixture comprising the inert gas mixed with 0.025% by volume of fluorine gas; and
        after flowing the fluorination agent, flowing the inert gas into the filter via the inlet, the inert gas exiting the filter via the outlet.

18. The method of claim 17, wherein the housing and the support structure comprise a weldable thermoplastic, and wherein the polymer membrane comprises an organic polymer.

19. The method of claim 17, wherein the polymer membrane and support structure remain within the housing between fluorinating the filter and inserting the fluorinated filter into the semiconductor photolithography apparatus.

20. The method of claim 17, wherein the photoresist is filtered at a point of use or at a point of distribution.

* * * * *